W. C. DOWNS.
Strap-Fasteners for Overshoes.
No. 149,451.            Patented April 7, 1874.
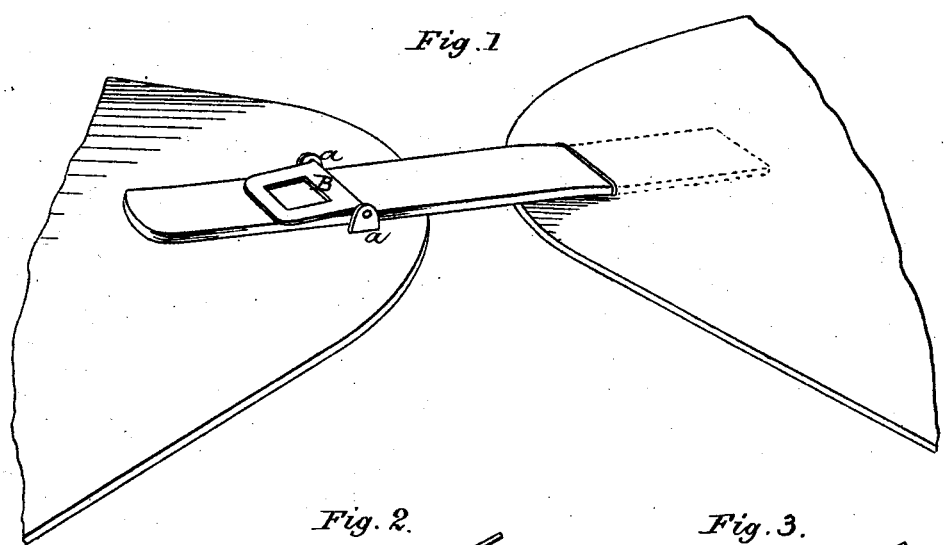
 
 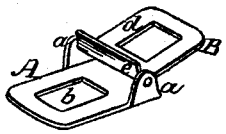
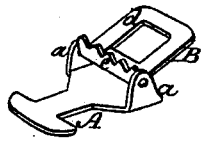
Witnesses
Philip T. Garner
A. B. Cauldwell.
Inventor.
William C. Downs
By Mr. B. Mord
Attorney
AM. PHOTO-LITHOGRAPHIC Co. N.Y. (OSBORNE'S PROCESS.)

UNITED STATES PATENT OFFICE.

WILLIAM C. DOWNS, OF PROVIDENCE, RHODE ISLAND.

IMPROVEMENT IN STRAP-FASTENERS FOR OVERSHOES.

Specification forming part of Letters Patent No. 149,451, dated April 7, 1874; application filed March 10, 1874.

*To all whom it may concern:*

Be it known that I, WILLIAM C. DOWNS, of the city and county of Providence, in the State of Rhode Island, have invented certain new and useful Improvements in Strap-Fasteners for Overshoes.

My improvements relate generally to strap-fasteners for that class of shoes which have two side or heel flaps and a connecting-strap, but are particularly valuable in connection with overshoes which are composed of textile fabrics and rubber, and are commonly known as "Buckle Arctics." The objects sought and practically attained by my improvements are the attachment of the fastener to the flap or strap in a neat, economical, and secure manner, and also so that when a strap is engaged therewith it will be held between one plain serrated or toothed surface of the fastener and a coincident non-metallic cushioned surface, whereby it may be held by comparatively little pressure and with greater security than would be the case if plain coincident metallic surfaces were employed, and with less wear or liability of injury to the strap than if roughened or toothed metallic surfaces were wholly relied upon for engaging therewith; and my invention consists in providing the base-plate of the fastener with an upper or engaging surface of leather, cloth, or other suitable cushioning material; and I do hereby declare that the following specification, taken in connection with the drawings furnished and forming a part thereof, is a clear, true, and accurate description thereof.

In the drawings, Figure 1 represents one of my overshoe-fasteners complete, as if attached to a pair of overshoe-flaps. Figs. 2 and 3 represent, in section, two fasteners attached to the flap. Figs. 4, 5, and 6 represent, in perspective, fasteners detached from the flap.

The base-plate A is composed of sheet metal, and it is preferably cut in one piece with the two projecting ears $a$, which are subsequently bent upward at right angles to the surface of the plate. Its form may be varied, but it is desirable, for purposes of ready and secure attachment, that it be provided either with an opening, as at $b$, in Figs. 4 and 5, or with recessed sides and a narrow neck, as at $c$, in Fig. 6. Each of the ears has a hole punched adjacent to its upper end. It is desirable that the rear end of the base-plate shall extend but little, if any, beyond the rear edges of the upturned ears. B denotes the fastening-lever. It is preferable that it also be cut from one piece of metal, with projecting lugs or pivots on either side, for serving as fulcrums when entered into the holes of the ears $a$ of the base-plate. The fastening-lever has a long arm, $d$, and a short arm, $e$, and each, when properly constructed, occupies a position at right angles to the other. The short arm may have a plain, smooth edge, as shown in Figs. 4 and 5, or a serrated edge, as shown in Fig. 6. When to be employed with a strap composed mainly of a textile fabric, the smooth edge is preferable. In rubber Arctic overshoes the flaps are generally composed of an exterior and an interior textile fabric, with an interposed layer of soft-rubber compound, which is subsequently vulcanized, thereby firmly uniting the two fabrics. When the base-plate of one of my fasteners is to be applied to such a flap its proper position thereon is determined, and two slight cuts made in the upper fabric for inserting the ears $a$ from the under side, and when the plate has been so placed the interior fabric, properly coated like the other, with the soft-rubber compound, is then united with the exterior fabric, and the two are closely pressed at all points, and particularly adjacent to the base-plate, so as to effect a complete unity on all sides thereof, and by that means securely bind it in position. When the plate has the central opening, as at $b$, the two fabrics are pressed together and united at that point, and a similar effect is attained with the narrow neck, as shown in Fig. 6. After being so placed and the rubber vulcanized, the base-plate is absolutely incapable of any movement independent of the fabrics with which it is united. When the fasteners are required on leather, or on a heavy textile fabric of a single thickness, the base-plate is put on the under side, as in the case of the exterior fabric, and the ears thereof are projected through slits cut in the same manner as described. A simple stitch or two is then employed at the neck, for instance, for securing it in position. It will be seen that the height of the ears must admit of the presence, between the engaging edge of the short arm of the lever $e$ and the upper surface of the base-plate, of the superimposed fabric, and also, while under compression, of the strap itself, and that such a base-piate, with ears of such a length, and provided with a fastening-lever adapted thereto, could not serve as a fastener for a strap which had been adapted thereto under the conditions stated, if the base-plate were secured to the upper surface of the strap or fabric, as usual with friction-buckles. The fastening-lever is inserted after the shoe is vulcanized by springing the ears slightly apart to admit of the entrance of the pivoting-lugs into the holes prepared in the ears to receive them. When the strap is inserted the fastening-lever is brought over so as to cause the edge of the short arm to firmly compress both the strap and the superimposed portion of the flap between the base-plate and the edge of the short arm of the lever. The lever operates somewhat after the manner of a friction-buckle, but when the fastener is mounted it will be seen that the lever serves merely to unite, by the force of compression, the strap with the exterior or surface portion of the flap with which it is held in contact, and therefore, so long as the two are thus closely held together, there can be no strain on the points of connection between the base-plate and the flap, as it is wholly borne by the flap and strap, which are directly united with each other by frictional contact. The long arm of the lever, on being brought forward, springs down and, with its outer end, firmly holds the tip or free end of the strap closely against the flap. By having the rear edge of the base-plate at a point closely adjacent to the rear edges of the ears, the downward pressure of the strap, when the lever is brought forward, more readily causes the front end of the plate to rise and meet the corresponding end of the lever, thus contributing to the proper holding of the interposed free end of the strap.

In order to prevent any wear of that portion of the fabric which overlies the base-plate, a thin surface layer of vulcanizable rubber compound, of a color corresponding with that of the fabric, may be applied between the projecting ears, so that the strap will be in contact therewith, and thereby be even more firmly held than if the plain cloth surface were relied on. The base-plate should be of sufficient thickness to afford ears of proper rigidity, and care should also be taken in proportioning the size and strength of the pivots on the lever, as considerable strain is necessarily borne by them in properly compressing the strap. When the serrated edge is employed, as shown in Fig. 6, the teeth should only be long enough to slightly enter the strap, as the compression function of the short arm should not be by any means impaired. The fastener, when attached, shows nothing but the ears of the base-plate and the lever, and is, therefore, neat in its appearance, and there is no bulky mass to uncomfortably press the foot at the point of fastening.

The base-plate and lever may be made of iron and simply japanned to prevent corrosion, or the lever may be made of fine or plated metal, if ornamentation be desirable.

Having thus described my invention, I claim as new and desire to secure by Letters Patent—

A shoe-strap fastener, which is composed of a two-armed lever, and a base-plate, which is provided with ears for engaging with the lever, and is also provided with a strap-engaging surface, which is composed of an elastic or impressible material, for frictional contact with the strap, substantially as described.

WM. C. DOWNS.

Witnesses:
 CHARLES SELDEN,
 JOHN C. PURKIS.